United States Patent [19]
Rinehart

[11] Patent Number: 6,135,501
[45] Date of Patent: *Oct. 24, 2000

[54] LUBRICANT DELIVERY AND RETRIEVAL VEHICLE AND METHODS OF MANUFACTURE AND OPERATION THEREOF

[75] Inventor: Gregory E. Rinehart, Weatherford, Tex.

[73] Assignee: The Lube Company, Fort Worth, Tex.

[*] Notice: This patent issued on a continued prosecution application filed under 37 CFR 1.53(d), and is subject to the twenty year patent term provisions of 35 U.S.C. 154(a)(2).

[21] Appl. No.: 09/152,534

[22] Filed: Sep. 14, 1998

[51] Int. Cl.$^7$ ...................................................... B60P 3/22
[52] U.S. Cl. ...................... 280/838; 137/234.6; 187/216; 220/573; 414/480; 414/537
[58] Field of Search ...................................... 280/830, 834, 280/836, 838, 32.6; 137/234.6; D12/14; 414/491, 477, 478, 479, 480, 537, 494; 220/562, 564, 567, 573; 184/1.5; 254/91, 3 R, 3 C; 141/98, 88, 232; 187/216, 221

[56] References Cited

U.S. PATENT DOCUMENTS

| | | |
|---|---|---|
| 2,765,938 | 10/1956 | Addezio . |
| 3,032,217 | 5/1962 | Musson et al. . |
| 3,308,845 | 3/1967 | Bellas et al. . |
| 4,724,875 | 2/1988 | Baldwin et al. ........................... 141/98 |
| 4,789,047 | 12/1988 | Knobloch ............................. 137/234.6 |
| 5,033,489 | 7/1991 | Ferre et al. ........................... 137/234.6 |
| 5,133,633 | 7/1992 | Grata ....................................... 414/477 |
| 5,833,294 | 11/1998 | Williams et al. ...................... 296/24.1 |

*Primary Examiner*—Anne Marie Boehler

[57] ABSTRACT

A service vehicle and methods of manufacturing and operating the same to provide lubrication services. In one embodiment, the service vehicle includes: (1) a service vehicle chassis having a cab and a rear frame, (2) first and second ramps coupled to, supported by and movable in tandem with respect to the rear frame between a vehicle loading position and a vehicle servicing position, the first and second ramps laterally separated by a given distance and (3) a used lubricant collection tank, coupled to and supported by the rear frame at a location between the first and second ramps, that receives used lubricant draining from a lubricant sump of the service vehicle.

12 Claims, 3 Drawing Sheets

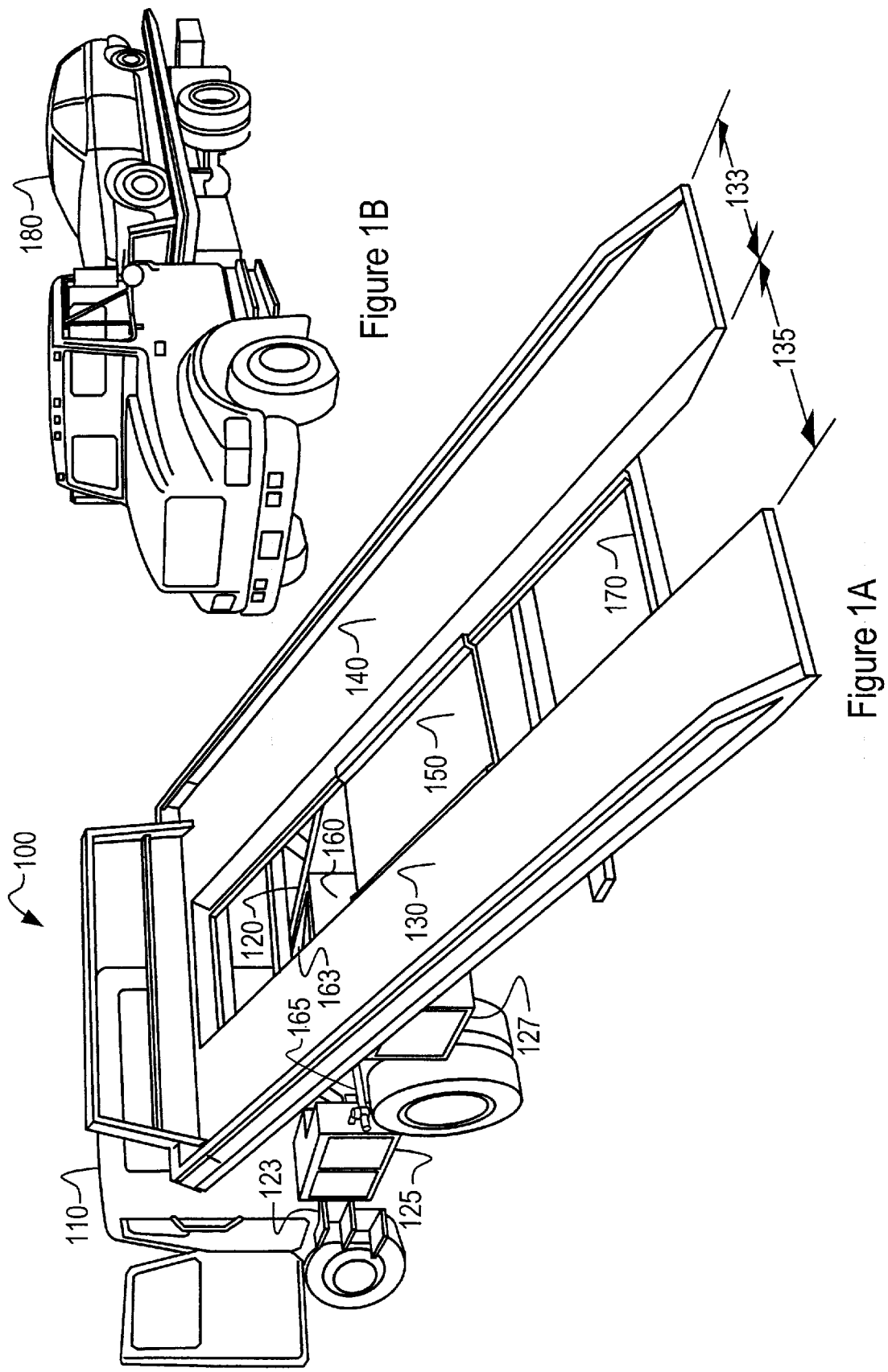

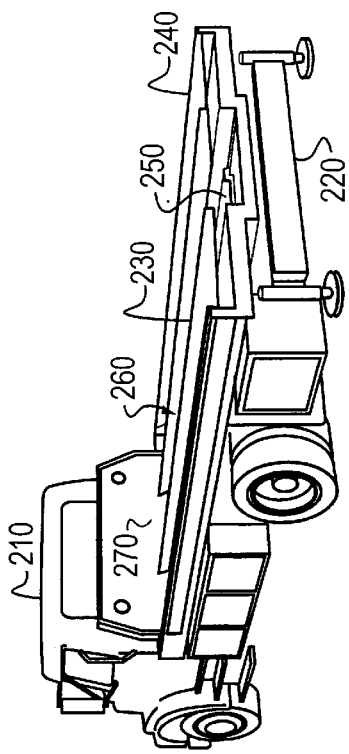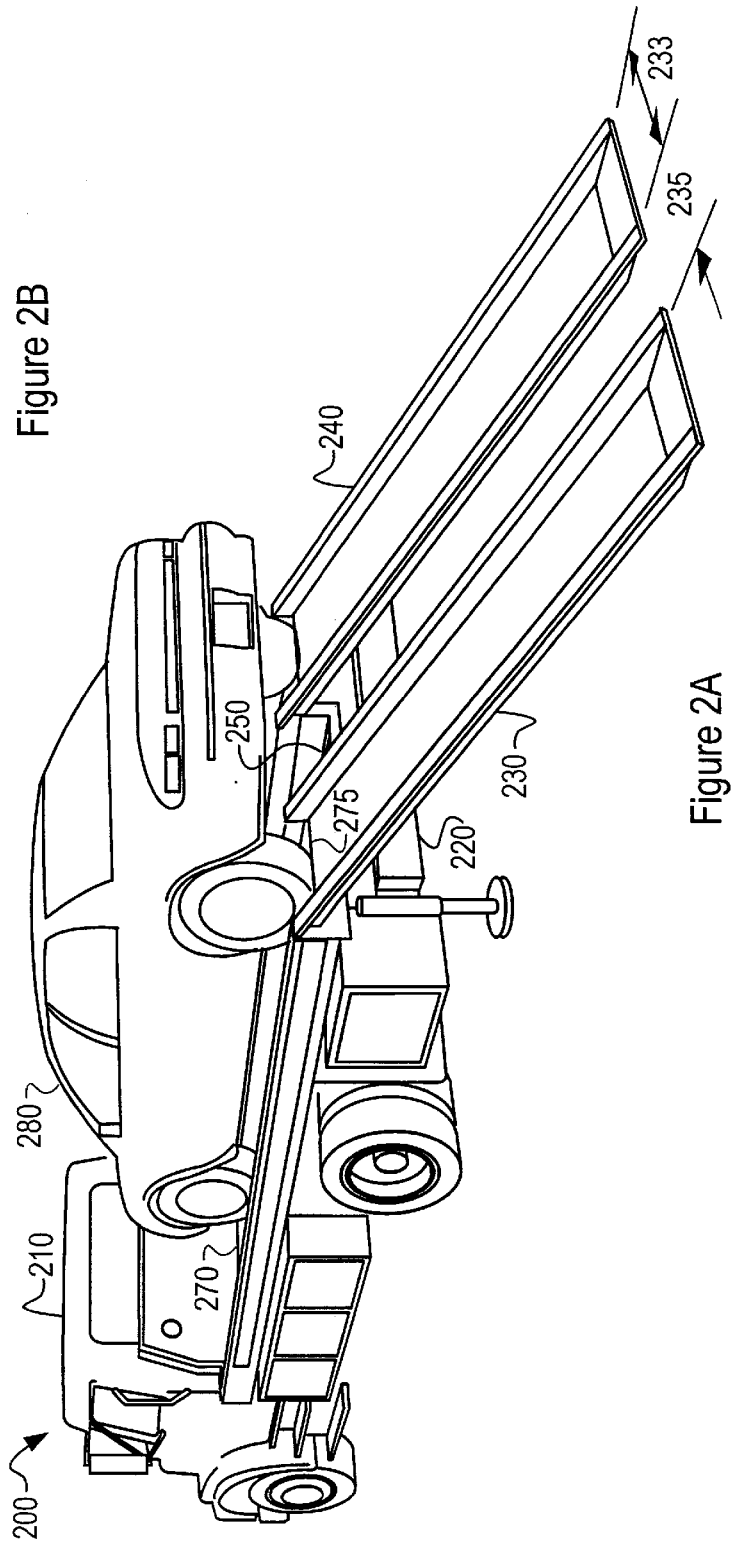

it is a primary object of the present invention to provide a vehicle adapted to drain the lubricant from a vehicle to be serviced.

LUBRICANT DELIVERY AND RETRIEVAL VEHICLE AND METHODS OF MANUFACTURE AND OPERATION THEREOF

TECHNICAL FIELD OF THE INVENTION

The present invention is directed, in general, to portable lubricant service vehicles and, more specifically, to a lubricant delivery and retrieval vehicle and methods of manufacturing and operating the same.

BACKGROUND OF THE INVENTION

With the millions of cars on the roads today, maintenance of their engines has become big business. The need to maintain proper engine lubrication has caused the popularity of fast oil change and lubrication shops to grow rapidly. Nevertheless, with their fixed locations, the automobile owner still must take from 15 to 30 minutes from his schedule to have an oil change done while he waits.

While these shops are convenient for a majority of the motoring public, there is one major segment of automobile owners for which this is inconvenient and even costly—rental car agencies. With their large number of vehicles, and the rapid accumulation of mileage on the vehicles, these automobiles are in frequent need of oil change and lubrication. The inconvenience to the rental car agency is in the need to have a driver deliver each automobile to a fast oil change shop, wait on the oil change, and then return the vehicle to the rental car agency lot. With a large rental car agency, this procedure could easily require one person full time simply ferrying vehicles back and forth to the oil change shop. Several factors affect the cost to the rental car agency of having a vehicle's oil changed. In fact, the cost of changing the oil goes far beyond the actual amount paid to the oil change shop. Among the most significant cost factors are: (a) the additional mileage (wear and tear) on the car, (b) the gasoline to drive it to and from the oil change shop, (c) the vehicle's downtime while it is at the oil change shop, (d) the increased accident risk of having the vehicle on the highways while en route, and (e) the non-productivity of the driver while he or she waits for the oil to be changed. When all of these hidden costs are considered, the total oil change cost could easily double the amount paid to the oil change shop. Alternatively, the rental car agency could invest in its own oil change facility, however that is a capital investment which most agencies are often reluctant to make.

While mobile oil change and lubrication have been done for heavy construction equipment for many years, the essential reasons and approach were different from the invention to be described. The reasons for on-site oil changes of heavy construction equipment are: (1) impracticality of transporting (driving or trailering) the equipment for such minor maintenance, (2) the construction equipment is unavailable for use while being transported and serviced, and (3) few maintenance shops can accommodate the special needs of heavy construction equipment. Because of the size of the equipment being serviced, these heavy equipment service trucks have usually been custom built directly on two ton, or larger, truck frames for the specific needs of the heavy equipment fleet. The large size of the service truck allows sufficient oil and other lubricant volumes to accommodate the large demands of the heavy equipment.

The introduction of mobile oil change operations to service automotive fleets has met with phenomenal acceptance. In particular, some of the largest rental car agencies have embraced the concept of an on-site mobile oil change operation which eliminates their need to constantly shuttle their vehicles back and forth to a fast oil change franchise. An expeditious method of fabricating a mobile lubricant recovery and delivery system was urgently needed. Therefore a stand-alone, mobile lubricant recovery and delivery system which could be assembled on a pallet was disclosed in co-pending application Ser. No. 09/036,748, filed Mar. 9, 1998, entitled "Integrated Lubricant Delivery and Retrieval Pallet and Method of Manufacture Thereof," commonly assigned with the present application. While perfectly adequate for the intended use, the system described requires the service technician to (a) jack the serviced vehicle with a conventional service or floor jack, (b) access the lubricant drain plug from a portable automotive creeper, (c) catch the used lubricant in a portable oil drain pan, and (d) pour the used lubricant into a used lubricant collection tank within the servicing vehicle. Two areas which could be improved with this system involve the jack and the portable oil drain pan.

Even the smallest service jack capable of lifting a nominal 2½ tons weighs a minimum of about 30 pounds. Therefore, some provision must be made to secure the jack within the servicing vehicle to prevent the jack from moving when the vehicle is in motion, lest some equipment be damaged. Thus in the prior art, a specific storage location over the rear wheel well was designated and equipped to secure the service jack. With the service jack secured within the cargo compartment of the service vehicle, it must be removed from the vehicle to the normal use location on the parking lot surface. The traditional approach is for the jack to be lifted into and out of the cargo compartment by the service technician. Although 30 pounds is well within the normal lifting capacity of an adult service attendant, the repetitive nature of loading and unloading the jack into the service vehicle introduces a significant hazard for improper lifting techniques which can cause injury to the back of the attendant or the possibility of dropping the jack on the service technician's foot. The deeper the storage location for the jack is within the cargo compartment of the service vehicle, the higher is the risk of back injury to the attendant. The current location available for the service jack storage, i.e., over the rear wheel well, increases the hazard of improper alignment of the spine and possible injury. The attendant must lean substantially over the rear bumper and into the cargo compartment of the service vehicle. Accordingly, a storage location within the vehicle bumper was disclosed in co-pending application Ser. No. 152,535, filed Sep. 14, 1998, entitled "Vehicle Bumper with Integral Jack and Method of Manufacture Thereof," now U.S. Pat. No. 5,979, 953, commonly assigned with the present application. However, the system described still required the attendant to lift the service jack between the bumper storage location and the parking lot surface.

Also in the prior art, the oil drain pan must be pulled from under the serviced vehicle. The pan contents must then be poured into the used lubricant collection tank located within the servicing vehicle. These actions introduce the possibility of spillage or splashing, whether on the parking lot surface or inside the servicing vehicle. Since the used lubricant is very dirty, any spillage could be extremely messy and difficult to clean up. Because the used lubricant collection tank is a significant distance inside the servicing vehicle, the probability of spillage is increased.

Therefore, what is needed in the art is a more efficient form of outfitting a service vehicle that eliminates the need for a service jack and portable oil drain pan.

SUMMARY OF THE INVENTION

To address the above-discussed deficiencies of the prior art, it is a primary object of the present invention to provide a vehicle adapted to drain the lubricant from a vehicle to be serviced.

In the attainment of the above-described primary object, the present invention provides a service vehicle (or lubricant delivery and retrieval vehicle) and methods of manufacturing and operating the same to provide lubrication services. In one embodiment, the vehicle includes: (1) a service vehicle chassis having a cab and a rear frame, (2) first and second ramps coupled to, supported by and movable in tandem with respect to the rear frame between a vehicle loading position and a vehicle servicing position, the first and second ramps laterally separated by a given distance and (3) a used lubricant collection tank, coupled to and supported by the rear frame at a location between the first and second ramps, that receives used lubricant draining from a lubricant sump of the service vehicle.

The present invention therefore introduces the broad concept of recovering used lubricant from a vehicle to be serviced by placing the vehicle to be serviced on ramps of the service vehicle and draining the lubricant into the used lubricant collection tank. Draining may be purely by gravity and may be by direct stream if the sump is directly above the collection tank.

In one embodiment of the present invention, the first and second ramps are substantially parallel with respect to the rear frame when in the vehicle servicing position. This usually renders the vehicle to be serviced substantially horizontal, which is advantageous for lubricant service on most vehicles. Alternatively, the first and second ramps may remain angled with respect to the rear frame, correspondingly angling the vehicle to be serviced.

In one embodiment of the present invention, the first and second ramps rotate with respect to the rear frame. Alternatively, the first and second ramps may simply translate.

In one embodiment of the present invention, the vehicle further includes a creeper slidably mounted to the rear frame between the first and second ramps to traverse the rear frame parallel to a longitudinal axis of the first and second ramps. Those skilled in the art are familiar with creepers and their advantages in servicing vehicles from underneath. The present invention can accommodate a creeper to allow a service technician access to underneath the vehicle to be serviced.

In related embodiments, the vehicle also includes structures adapted to deliver new lubricant to a vehicle to be serviced. In one such embodiment, the vehicle further includes first and second lubricant source tanks, coupled to and supported by the rear frame, for containing quantities of corresponding first and second grades of lubricant. In another such embodiment, the vehicle further includes a pressure source, coupled to and supported by the rear frame and coupled to the first and second lubricant source tanks by a pressure distribution line, that pressurizes the first and second grades of lubricant. In yet another such embodiment, the vehicle further includes a lubricant dispensing line, coupled to at least one of the first and second lubricant source tanks, for dispensing a selected one of the first and second grades of lubricant to a vehicle to be lubricated located on the first and second ramps. Of course, the present invention does not require such lubricant delivery ability.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following description taken in conjunction with the accompanying drawings, in which:

FIGS. 1A and 1B illustrate perspective views of one embodiment of a lubricant delivery/retrieval vehicle constructed according to the principles of the present invention;

FIGS. 2A and 2B illustrate perspective views of an alternative embodiment of the lubricant delivery/retrieval vehicle of FIGS. 1A and 1B.

DETAILED DESCRIPTION

Figure 3:
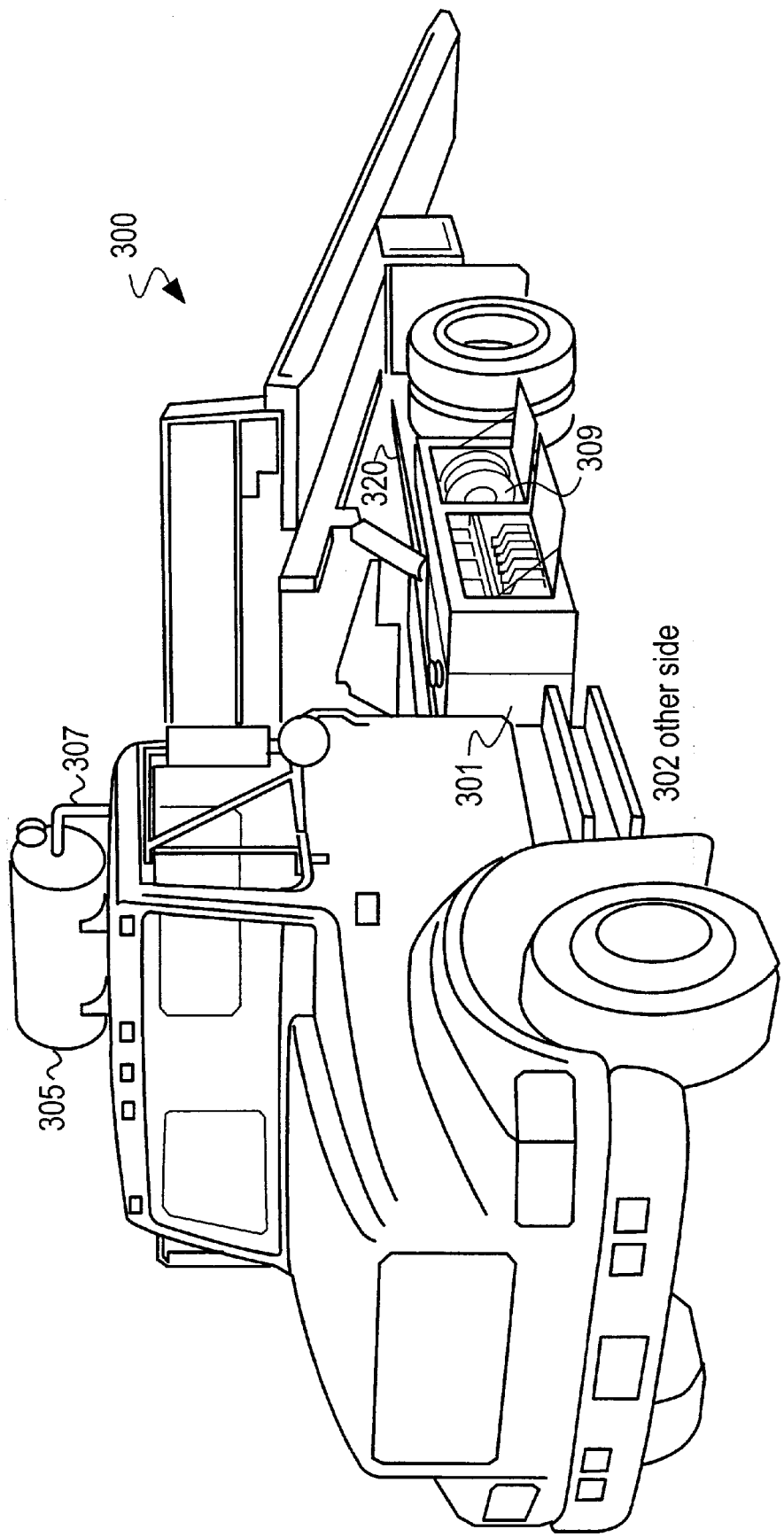
FIG. 3 illustrates a perspective view of another alternative embodiment of the lubricant delivery/retrieval vehicle of FIGS. 1A and 1B.

For the purposes of clarity and brevity during the following discussion, the service vehicle will be generally referred to as a "vehicle," to distinguish it from the vehicle being serviced which will be referred to as an "automobile." One who is skilled in the art will readily recognize that the "automobile" may be any of a number of gasoline, diesel or propane powered vehicles including, but not limited to: coupes, sedans, sport utility vehicles, pickup trucks or off-road vehicles.

Referring initially to FIGS. 1A and 1B, illustrated are perspective views of one embodiment of a lubricant delivery/retrieval vehicle constructed according to the principles of the present invention. The lubricant delivery/retrieval vehicle, generally designated 100, comprises a vehicle cab 110, a rear frame 120, first and second vehicle ramps 130, 140, a creeper 150, and a used lubricant collection tank 160. One who is skilled in the art is familiar with the function and operation of a vehicle cab 110. The rear frame 120 comprises an attendant ladder 123, and storage compartments 125, 127. The attendant ladder 123 provides access to the first and second vehicle ramps 130, 140 and the automobile oil filler port when an automobile 180 is on the service vehicle 100. One who is skilled in the art will readily conceive of other ladder mechanisms, such as kick steps, pull-out ladder, etc., that provide a similar means of access. In one embodiment of the present invention, the storage compartments 125, 127 provide storage space for tools, oil and air filters, and oil.

The first and second vehicle ramps 130, 140 are designed to support the automobile 180 which is to be serviced, and for the sake of clarity, will henceforth be referred to as first and second automobile ramps. The first and second automobile ramps 130, 140 are coupled to, supported by, and movable with respect to the rear frame 120. The first and second automobile ramps 130, 140 are substantially parallel to the longitudinal axis of the rear frame 120. In the illustrated embodiment, the first and second automobile ramps 130, 140 are movably coupled to the rear frame between two positions: an automobile loading position (FIG. 1A) and an automobile servicing position (FIG. 1B). The first and second automobile ramps 130, 140 are of a width 133 and laterally separated by a distance 135 sufficient to accommodate the tire span range of the automobiles 180 to be serviced. In one embodiment, the first and second automobile ramps 130, 140 may be fixedly attached to a vehicle bed 170. The vehicle bed 170 may be movably coupled to the vehicle frame 120, so that the first and second vehicle ramps 130, 140 may rotate and/or translate with respect to the rear frame 120. This rotation and/or translation is required to reposition between the automobile servicing position and the automobile loading position. One who is skilled in the art is familiar with mechanical and hydraulic systems for translating and/or rotating a vehicle bed 170.

In one embodiment of the present invention, the automobile 180 being serviced is driven onto the first and second automobile ramps 130, 140 when the first and second automobile ramps 130, 140 are in the vehicle loading position (FIG. 1A). With the automobile 180 on the first and second automobile ramps 130, 140, the ramps 130, 140 may then be rotated and/or translated to the automobile servicing position (FIG. 1B). In one embodiment of the present invention, the creeper 150 may be slidably affixed to the vehicle frame 120 between the first and second automobile ramps 130, 140. FIG. 1A shows creeper 150 mounted directly to the first and second ramps to traverse the rear frame parallel to a longitudinal axis of the first and second ramps. The used lubricant collection tank 160 comprises a catch basin 163 and a used lubricant drain valve 165. The catch basin 163 acts as a funnel for the used lubricant draining from the automobile 180. The used lubricant drain valve 165 simplifies transfer of the collected lubricant to a recycling tank (not shown).

Referring now to FIGS. 2A and 2B, illustrated are perspective views of an alternative embodiment of the lubricant delivery/retrieval vehicle of FIGS. 1A and 1B. The lubricant delivery/retrieval vehicle, generally designated 200, comprises a vehicle cab 210, a rear frame 220, first and second automobile ramps 230, 240, a creeper 250, and a used lubricant collection tank 260 analogous in location and function to their counterparts of FIGS. 1A and 1B. In this embodiment, the first and second automobile ramps 230, 240 are coupled to, supported by, and movable with respect to the rear frame 220 in such a manner that the ramps 230, 240 may extend to the ground as shown in FIG. 2A. The first and second automobile ramps 230, 240 may be movably coupled to the rear frame 220 to be manually, or by power assist, moved between the two positions, i.e., the automobile loading/servicing position (FIG. 2A) and the vehicle-in-transit position (FIG. 2B). The first and second automobile ramps 230, 240 are of a sufficient width 233 and laterally separated by a distance 235 sufficient to accommodate the tire span range of automobiles 280 to be serviced. In one embodiment, the first and second automobile ramps 230, 240 may be slidably extended from a vehicle bed 270. The first and second automobile ramps 230, 240 may rotate and/or translate with respect to the rear frame 220 as required to reposition between the vehicle-in-transit position (FIG. 2B) and the vehicle loading/servicing position (FIG. 2A). One who is skilled in the art is familiar with mechanical and/or hydraulic systems for translating and/or rotating automobile ramps 230, 240. In one embodiment of the present invention, the automobile 280 is driven onto the first and second automobile ramps 230, 240 when the first and second automobile ramps 230, 240 are in the vehicle loading position (FIG. 2A). In an alternative embodiment, the bed 270 of the delivery/retrieval vehicle 200 may be hydraulically tilted slightly to achieve acceptable frame clearance of the automobile 280 as it passes the juncture 275 of the ramps 230, 240 and the bed 270.

Refer now once again to FIGS. 1A and 1B. With the first and second automobile ramps 130, 140 in the automobile loading position (FIG. 1A), an automobile 180 is driven onto the ramps 130, 140. The ramps 130, 140 and the automobile 180 may then be rotated and/or translated to the automobile servicing position (FIG. 1B), where the automobile 180 is substantially horizontal. In this position, the oil sump drain of the automobile 180 is located above the used lubricant collection tank 160. In an alternative embodiment, the first and second automobile ramps 130, 140 may be translated forward on the vehicle frame 120, while remaining tilted to some degree to assist in draining the used lubricant from the automobile 180.

With the automobile 180 in position, the service technician may use the creeper 150 to ride on the vehicle bed 170 between the first and second vehicle ramps 130, 140 to access the oil sump drain plug (not shown). In a particular aspect of this embodiment, the first and second automobile ramps 130, 140 are set at a sufficient height above the vehicle bed 170 to provide adequate clearance for the creeper 150 and the service technician to traverse lengthwise under the automobile 180 without hazard. Thus, the first and second automobile ramps 130, 140 and associated equipment obviate the need for a service jack to accomplish an automobile lubrication.

When the service technician removes the automobile oil sump drain plug, used oil will drain by gravity directly into the catch basin 163 on the used lubricant collection tank 160 located between the first and second automobile ramps 130, 140. The automobile used oil filter may likewise be captured in the catch basin 163. When oil draining is complete, the oil sump drain plug and a new oil filter is installed. The service technician may use the attendant ladder 123 to access the automobile oil filler port and to restart the automobile engine, reestablishing proper oil flow in the automobile engine. The first and second automobile ramps 130, 140 may then be rotated back to the automobile loading position, from whence the automobile 180 may be driven from the ramps.

After collecting a sufficient volume of used lubricant, and with the service vehicle 100 located at the business service center, the used lubricant is drained through drain valve 165 to a central collection tank and recycled. In an alternative embodiment, the drain valve 165 is equipped with a fluid quick connect to speed draining the used lubricant. One who is skilled in the art will recognize that the method of used oil collection and automobile servicing for the embodiment of FIGS. 2A and 2B is essentially the same as that just described.

Referring now to FIG. 3, illustrated is a perspective view of another alternative embodiment of the lubricant delivery/retrieval vehicle of FIGS. 1A and 1B. In the illustrated embodiment, a lubricant delivery/retrieval vehicle 300 may be equipped with first and second lubricant source tanks 301, 302 (tank 302 on the right side of vehicle frame) coupled to and supported by the rear frame 320, for storing and dispensing quantities of corresponding first and second grades of lubricant, which are nominally automotive grades of motor oil. The grades may be single viscosity or multi-viscosity. Those who are skilled in the art are familiar with automotive grades of motor oil. In a further aspect of this embodiment, the lubricant delivery/retrieval vehicle 300 may comprise a pressure source 305, coupled to and supported by the rear frame 320. The pressure source 305 is coupled to the first and second lubricant source tanks 301, 302 by a pressure distribution line 307, that provides pressure for dispensing the first and second grades of lubricant.

In yet a further aspect of this embodiment, the lubricant delivery/retrieval vehicle 300 may comprise a lubricant dispensing line 309, coupled to at least one of the first and second lubricant source tanks 301, 302. The lubricant dispensing line 309 enables dispensing a selected one of the first and second grades of lubricant to the automobile being serviced.

From the above, it is apparent that the present invention provides a service vehicle and methods of manufacturing and operating the same to provide lubrication services. In one embodiment, the vehicle includes: (1) a service vehicle chassis having a cab and a rear frame, (2) first and second ramps coupled to, supported by and movable in tandem with respect to the rear frame between a vehicle loading position and a vehicle servicing position, the first and second ramps laterally separated by a given distance and (3) a used lubricant collection tank, coupled to and supported by the rear frame at a location between the first and second ramps, that receives used lubricant draining from a lubricant sump of the vehicle.

Although the present invention and its advantages have been described in detail, those skilled in the art should understand that they can make various changes, substitutions and alterations herein without departing from the spirit and scope of the invention in its broadest form.

What is claimed is:

1. A service vehicle, comprising:
   a service vehicle chassis having a cab and a rear frame;
   first and second ramps coupled to, supported by and movable in tandem with respect to said rear frame between a vehicle loading position and a vehicle servicing position, said first and second ramps laterally separated by a given distance;
   a used lubricant collection tank, coupled to and supported by said rear frame at a location between said first and second ramps, that receives used lubricant draining from a lubricant sump of a vehicle to be lubricated; and
   a creeper slidably mounted directly to said first and second ramps to traverse said rear frame parallel to a longitudinal axis of said first and second ramps.

2. The vehicle as recited in claim 1 wherein said first and second ramps are substantially parallel with respect to said rear frame when in said vehicle servicing position.

3. The vehicle as recited in claim 1 wherein said first and second ramps rotate with respect to said rear frame.

4. The vehicle as recited in claim 1 further comprising first and second lubricant source tanks, coupled to and supported by said rear frame, for containing quantities of corresponding first and second grades of lubricant.

5. The vehicle as recited in claim 4 further comprising a pressure source, coupled to and supported by said rear frame and coupled to said first and second lubricant source tanks by a pressure distribution line, that pressurizes said first and second grades of lubricant.

6. The vehicle as recited in claim 4 further comprising a lubricant dispensing line, coupled to at least one of said first and second lubricant source tanks, for dispensing a selected one of said first and second grades of lubricant to said vehicle to be lubricated.

7. A method of operating a service vehicle, comprising:
   providing a service vehicle chassis having a cab and a rear frame;
   providing first and second ramps coupled to, supported by and movable in tandem with respect to said rear frame between a vehicle loading position and a vehicle servicing position, said first and second ramps laterally separated by a given distance;
   receiving used lubricant draining from a lubricant sump of a vehicle to be lubricated with a used lubricant collection tank coupled to and supported by said rear frame at a location between said first and second ramps; and
   traversing said rear frame parallel to a longitudinal axis of said first and second ramps with a creeper slidably mounted directly to said first and second ramps.

8. The method as recited in claim 7 wherein said first and second ramps are substantially parallel with respect to said rear frame when in said vehicle servicing position.

9. The method as recited in claim 7 further comprising rotating said first and second ramps with respect to said rear frame.

10. The method as recited in claim 7 further comprising containing quantities of corresponding first and second grades of lubricant with first and second lubricant source tanks coupled to and supported by said rear frame.

11. The method as recited in claim 10 further comprising pressurizing said first and second grades of lubricant with a pressure source coupled to and supported by said rear frame and coupled to said first and second lubricant source tanks by a pressure distribution line.

12. The method as recited in claim 10 further comprising dispensing a selected one of said first and second grades of lubricant to said vehicle to be lubricated with a lubricant dispensing line coupled to at least one of said first and second lubricant source tanks.

* * * * *

UNITED STATES PATENT AND TRADEMARK OFFICE
CERTIFICATE OF CORRECTION

PATENT NO. : 6,135,501

DATED : October 24, 2000

INVENTOR(S) : Gregory E. Rinehart

It is certified that error appears in the above-identified patent and that said Letters Patent is hereby corrected as shown below:

Column 2, line 3, "152,535" should be --09/152535--

Signed and Sealed this

Seventeenth Day of April, 2001

*Attest:*

NICHOLAS P. GODICI

*Attesting Officer*  Acting Director of the United States Patent and Trademark Office